(12) United States Patent
Meng et al.

(10) Patent No.: US 9,618,785 B2
(45) Date of Patent: Apr. 11, 2017

(54) COLOR FILTER SUBSTRATE, METHOD FOR MANUFACTURING THE SAME, DISPLAY PANEL AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Weixin Meng, Beijing (CN); Yongshan Zhou, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 34 days.

(21) Appl. No.: 14/528,103

(22) Filed: Oct. 30, 2014

(65) Prior Publication Data

US 2015/0346545 A1    Dec. 3, 2015

(30) Foreign Application Priority Data

May 28, 2014    (CN) .......................... 2014 1 0231031

(51) Int. Cl.
*G02F 1/1335* (2006.01)
*G02B 5/20* (2006.01)
*G02B 5/22* (2006.01)
*G02F 1/1333* (2006.01)

(52) U.S. Cl.
CPC ....... *G02F 1/133514* (2013.01); *G02B 5/201* (2013.01); *G02F 1/133516* (2013.01); *G02B 5/22* (2013.01); *G02F 2001/133354* (2013.01)

(58) Field of Classification Search
CPC .......... G02F 1/133514; G02F 1/13394; G02F 1/133516; G02F 2001/133354; G02B 5/201; G02B 5/22
USPC ......................................... 349/106, 110, 155
See application file for complete search history.

(56) References Cited

U.S. PATENT DOCUMENTS

| 2007/0278491 A1* | 12/2007 | Liao .................... G02F 1/13394 257/72 |
| 2010/0225608 A1* | 9/2010 | Zhou ................... G02F 1/13338 345/173 |
| 2013/0016314 A1* | 1/2013 | Itou .................... G02F 1/13394 349/106 |

FOREIGN PATENT DOCUMENTS

| CN | 101071220 A | 11/2007 |
| CN | 102116960 A | 7/2011 |
| JP | 2006300975 A | 11/2006 |

OTHER PUBLICATIONS

First Office Action regarding Chinese application No. 201410231031.8, dated Feb. 19, 2016. Translation provided by Dragon Intellectual Property Law Firm.

* cited by examiner

*Primary Examiner* — Nathaniel R Briggs
(74) *Attorney, Agent, or Firm* — Harness, Dickey & Pierce, P.L.C.

(57) ABSTRACT

The present disclosure provides a color filter substrate, a method for manufacturing the same, a display panel and a display device. The color filter substrate includes a plurality of color filters and a black matrix arranged between adjacent color filters. The color filter substrate further includes a position limiting unit arranged on the black matrix and configured to clamp at least one of data lines and gate lines on the array substrate.

10 Claims, 2 Drawing Sheets

COLOR FILTER SUBSTRATE, METHOD FOR MANUFACTURING THE SAME, DISPLAY PANEL AND DISPLAY DEVICE

CROSS-REFERENCE TO RELATED APPLICATION

The present application claims a priority of the Chinese patent application No. 201410231031.8 filed on May 28, 2014, which is incorporated herein by reference in its entirety.

FIELD OF THE INVENTION

The present disclosure relates to the field of display technology, in particular to a color filter substrate, a method for manufacturing the same, a display panel and a display device.

DESCRIPTION OF THE RELATED ART

Thin film transistor-liquid crystal displays (TFT-LCDs) have made a great progress in the past years, and replaced cold cathode fluorescent lamp (CCFL) displays to become mainstream products in the display field.

During the manufacture of a LCD panel, it is required to coat polyimide layers onto surfaces of an array substrate and a color filter substrate, and then rub the polyimide layers, so as to ensure that liquid crystal molecules can be aligned normally.

Currently, a cell-forming process for a liquid crystal display screen usually includes the steps of: coating a sealant at a periphery of one glass substrate with a sealant coating device, dripping liquid crystals in the middle of another glass substrate by one drop filling (ODF), adhering the two glass substrates in a vacuum, i.e., arranging the two glass substrates opposite to each other to form a cell, and curing the sealant. In the curing, the sealant is placed into a UV curing chamber to cure photosensitive components in the sealant, the sealant is partially cured by irradiating it with UV light for a short period of time, and the uncured sealant is then cured completely in a high-temperature furnace, thereby completing the entire cell-forming process. As a first curing step, the curing efficiency and curing effect of the UV curing step play a very important role in the entire cell-forming process.

However, due to the increasing demand on a display effect, a resolution of the liquid crystal display screen becomes higher and higher, resulting in a smaller pixel size, a thinner metallic wire for driving the liquid crystals to display an image, and a smaller black matrix region on the color filter substrate. Hence, there is an increasing demand on the alignment accuracy during the ODF. Usually, it is difficult to achieve the accurate alignment by merely adjusting an alignment device for the ODF. The higher the resolution of the liquid crystal display screen, the narrower a black matrix opposite to a data line. As shown in FIG. 1, in order to prevent the mixed light, the black matrix 3 on the color filter substrate 1 usually has a thickness greater than a thickness of a color filter 4, and the black matrix 3 is arranged opposite to but not in contact with a data line 5 on the array substrate 2. Because the black matrix 3 opposite to the data line 5 is relatively narrow, the data line 5 may easily go beyond a region of the black matrix 3 when aligning the color filter substrate 1 with the array substrate 2. As a result, such defects as cross color and light leakage may occur.

SUMMARY OF THE INVENTION

One technical problem to be solved by the present disclosure is how to prevent alignment offset for data lines or gate lines on an array substrate.

In order to solve the above technical problem, one embodiment of the present disclosure provides a color filter substrate arranged opposite to an array substrate to form a cell and thereby form a display panel. The color filter substrate includes a plurality of color filters and a black matrix arranged between adjacent color filters. The color filter substrate further includes a position limiting unit arranged on the black matrix and configured to clamp at least one of data lines and gate lines on the array substrate.

Further, the position limiting unit includes at least one first position limiting unit configured to clamp at least one of the data lines on the array substrate.

Further, the black matrix includes a plurality of first extension portions and a plurality of second extension portions; the plurality of first extension portions extend in a first direction and correspond to the data lines in a one-to-one manner; the plurality of second extension portions extend in a second direction perpendicular to the first direction and correspond to the gate lines in a one-to-one manner; wherein the first position limiting unit includes at least one pair of position limiting blocks projecting from two sides in the second direction of at least one of the first extension portions, respectively.

Further, the position limiting blocks in each pair are arranged symmetrically.

Further, the position limiting block in each pair has a length in the first direction identical to a length of the at least one of the first extension portions in the first direction.

Further, the position limiting unit further includes at least one second position limiting unit configured to clamp at least one of the gate lines on the array substrate.

Further, the black matrix includes a plurality of first extension portions and a plurality of second extension portions; the plurality of first extension portions extend in a first direction and correspond to the data lines in a one-to-one manner; the plurality of second extension portions extend in a second direction perpendicular to the first direction and correspond to the gate lines in a one-to-one manner; wherein the second position limiting unit includes at least one pair of position limiting blocks projecting from two sides in the first direction of at least one of the second extension portions, respectively.

Further, the position limiting blocks in each pair are arranged symmetrically.

Further, the position limiting block in each pair has a length in the second direction identical to a length of the at least one of the second extension portions in the second direction.

Further, the position limiting unit and the black matrix are formed integrally.

One embodiment of the present disclosure further provides a display panel including an array substrate and a color filter substrate arranged opposite to each other; wherein the color filter substrate includes a plurality of color filters and a black matrix arranged between adjacent color filters; the array substrate includes a plurality of gate lines, a plurality of data lines, and a plurality of pixel units defined by the gate lines and the data lines; and the color filter substrate further includes a position limiting unit arranged on the black matrix and configured to clamp at least one of the data lines and gate lines on the array substrate.

Further, the position limiting unit includes at least one first position limiting unit configured to clamp at least one of the data lines on the array substrate.

Further, the black matrix includes a plurality of first extension portions and a plurality of second extension portions; the plurality of first extension portions extend in a first direction and correspond to the data lines in a one-to-one manner; the plurality of second extension portions extend in a second direction perpendicular to the first direction and correspond to the gate lines in a one-to-one manner; wherein the first position limiting unit includes at least one pair of position limiting blocks projecting from two sides in the second direction of at least one of the first extension portions, respectively.

Further, the position limiting unit further includes at least one second position limiting unit configured to clamp at least one of the gate lines on the array substrate.

Further, the black matrix includes a plurality of first extension portions and a plurality of second extension portions; the plurality of first extension portions extend in a first direction and correspond to the data lines in a one-to-one manner; the plurality of second extension portions extend in a second direction perpendicular to the first direction and correspond to the gate lines in a one-to-one manner; wherein the second position limiting unit includes at least one pair of position limiting blocks projecting from two sides in the first direction of at least one of the second extension portions, respectively.

One embodiment of the present disclosure further provides a method for manufacturing a color filter substrate, which is arranged opposite to an array substrate to form a cell and thereby form a display panel, the method including: forming a color filtering layer including a black matrix and a plurality of color filters on a base substrate, and forming on the black matrix a position limiting unit configured to clamp at least one of data lines and gate lines on the array substrate.

Further, the forming on the black matrix a position limiting unit configured to clamp at least one of data lines and gate lines on the array substrate includes: forming on the black matrix at least one first position limiting unit configured to clamp at least one of the data lines on the array substrate, and forming on the black matrix at least one second position limiting unit configured to clamp at least one of the gate lines on the array substrate.

Further, the forming a color filtering layer including a black matrix and a plurality of color filters on a base substrate includes: forming a black matrix coating on the base substrate, and forming on the black matrix coating a groove corresponding to at least one of the data lines and the gate lines on the array substrate by a first patterning process; forming a pixel open region on the black matrix coating with the groove by a second patterning process, other region of the black matrix coating with the groove becoming the black matrix including the position limiting unit; and forming the color filters of the color filtering layer at the pixel open region.

Further, the forming a color filtering layer including a black matrix and a plurality of color filters on a base substrate includes: forming a black matrix coating on the base substrate, forming on the black matrix coating at least two grooves corresponding to at least one of the data lines and at least one of the gate lines on the array substrate by the first patterning process; forming a pixel open region on the black matrix coating with the grooves by the second patterning process, other region of the black matrix coating with the grooves becoming the black matrix with the first position limiting unit and the second position limiting unit; and forming the color filters of the color filtering layer at the pixel open region.

One embodiment of the present disclosure further provides a display device including the above display panel.

According to the color filter substrate, the method for manufacturing the same, the display panel and the display device of the present disclosure, the first position limiting unit configured to clamp the data line is arranged on the black matrix arranged opposite to the data line, so as to ensure accurate alignment of the data line on the array substrate with the black matrix on the color filter substrate, thereby preventing alignment offset for the LCD, reducing the occurrence of such defects as cross color and light leakage, and improving the yield of the product. Further, the second position limiting unit configured to clamp the gate lines is arranged on the black matrix arranged opposite to the gate line, so as to ensure accurate alignment of the gate line on the array substrate with the black matrix on the color filter substrate. In addition, the black matrix and the first, second position limiting units may be formed integrally, and as a result, the process steps and the process complexity may be reduced, thereby improving the production efficiency and saving materials.

DETAILED DESCRIPTION OF THE PREFERRED EMBODIMENTS

Implementation of the present disclosure will be described hereinafter in conjunction with the drawings and embodiments. The following embodiments are for illustrative purposes only, but shall not be used to limit the scope of the present disclosure.

Figure 1:
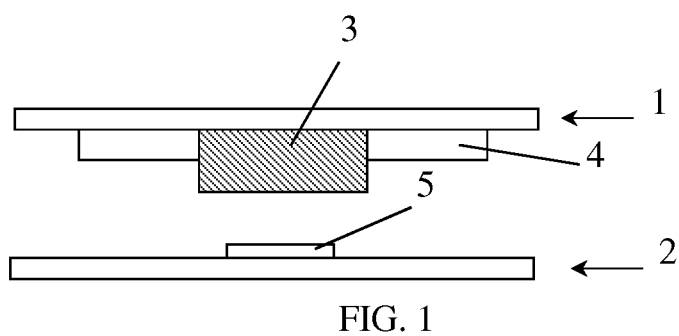
FIG. 1 is a sectional view of a display panel in the related art.
Figure 2:
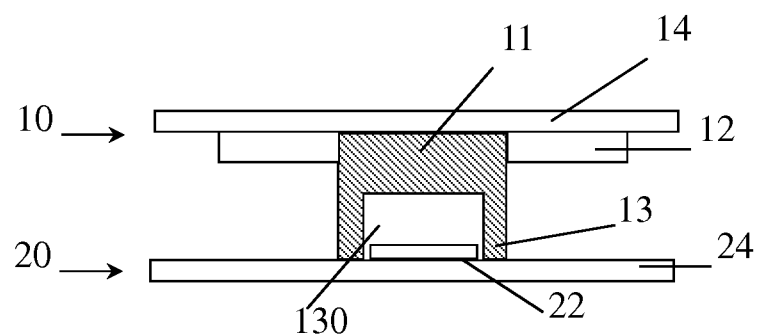
FIG. 2 is a sectional view of a display panel according to one embodiment of the present disclosure.
Figure 3:
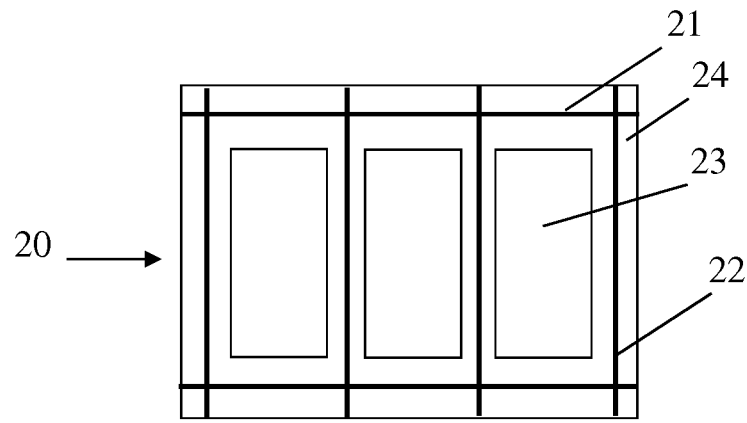
FIG. 3 is a schematic view showing an array substrate of the display panel according to one embodiment of the present disclosure.

As shown in FIG. 2, a display panel of one embodiment of the present disclosure includes an array substrate 20 and a color filter substrate 10. The color filter substrate 10 is arranged opposite to the array substrate 20 to form a cell and thereby form the display panel. As shown in FIG. 3, the array substrate 20 includes gate lines 21, data lines 22, and pixel units 23 defined by the gate lines 21 and the data lines 22. The gate lines 21 and the data lines 22 are formed on a base substrate 24 of the array substrate 20. The color filter substrate 10 includes a plurality of color filters 12 and a black matrix 11 arranged between adjacent color filters 12. The black matrix 11 and the color filters 12 are formed on a base substrate 14 of the color filter substrate 10.

Figure 4:
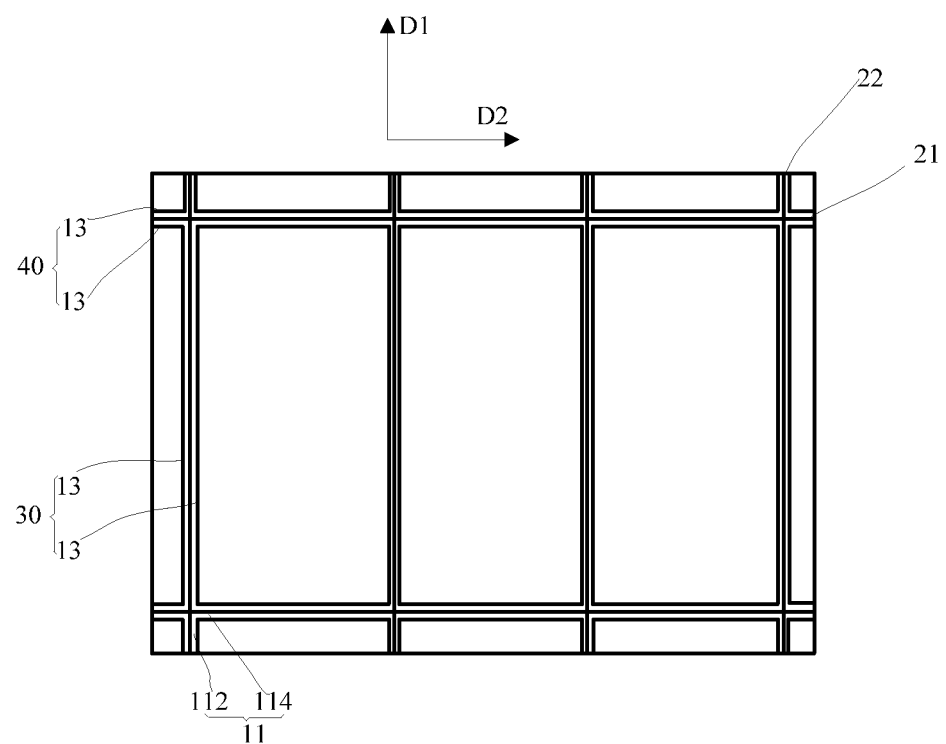
FIG. 4 is a schematic view showing relationship between a black matrix as well as a position limiting unit on a color filter substrate and gate lines as well as data lines on an array substrate of the display panel according to one embodiment of the present disclosure.

A position limiting unit (e.g., a first position limiting unit 30 and a second position limiting unit 40 in FIG. 4) is arranged on the black matrix 11 of the color filter substrate 10. The position limiting unit is configured to clamp the data line 22 and/or gate line 21 on the array substrate 20. Specifically, as shown in FIG. 4, the position limiting unit includes the first position limiting unit 30 configured to clamp the data line 22 on the array substrate 20. The first position limiting unit 30 is arranged on a surface of the black matrix 11 away from the base substrate 14 of the color filter substrate 10, i.e., on a surface of the black matrix 11 close to the array substrate 20 when the color filter substrate 10 and the array substrate 20 are arranged opposite to each other to form a cell, so that the first position limiting unit 30 on the black matrix 11 may clamp the data line 22 on the array substrate 20. In addition, the first position limiting unit 30 may be a projection extending from the black matrix 11 in a direction from the color filter substrate 10 to the array substrate 20. The first position limiting unit 30 has a height greater than or equal to a height of the data line 22, so that the first position limiting unit 30 may serve to support the color filter substrate 10 and the array substrate 20 to some extent in addition to clamping the data line 22, thereby reinforcing the strength of the display panel after the color filter substrate 10 and the array substrate 20 are arranged opposite to each other to form a cell.

According to one embodiment of the present disclosure, the first position limiting unit 30 configured to clamp the data line 22 is arranged on the black matrix 11 opposite to the data line 22, so as to accurately align the data line 22 on the array substrate 20 with the black matrix 11 on the color filter substrate 10. As a result, the alignment offset for the LCD may be avoided, thereby reducing the occurrence of cross color and light leakage, and improving the yield of the product.

In order to improve a resolution of the display panel, it is required to reduce a pixel size, a diameter of the data line for driving the liquid crystals to display an image, and a width of the black matrix opposite to the data line. Hence, in one embodiment, the first position limiting unit configured to clamp the data line is arranged on the black matrix opposite to the data line, so as to accurately align the data line on the array substrate with the black matrix on the color filter substrate. Further, in order to achieve the accurate alignment in a better manner and to prevent the alignment offset for the gate line 21 due to misoperation during the aligning, in the color filter substrate 10 of one embodiment, the second position limiting unit 40 may also be arranged on the black matrix 11 opposite to the gate line 21, so as to clamp the gate line 21 on the array substrate 20. The second position limiting unit 40 is of a structure identical to the first position limiting unit 30, and thus will not be described herein.

As shown in FIGS. 2 and 4, each of the first position limiting unit 30 and the second position limiting unit 40 includes a plurality of position limiting blocks 13 arranged at two sides of the black matrix 11 in an extending direction of the black matrix 11. For the first position limiting unit 30, the extending direction of the black matrix 11 refers to a direction parallel to a lengthwise direction of the data line 22, along which the black matrix 11 extends. For the second position limiting unit 40, the extending direction of the black matrix 11 refers to a direction parallel to a lengthwise direction of the gate line 21, along which the black matrix 11 extends. The position limiting blocks 13 may be symmetrically arranged at two sides of the black matrix 11 in the extending direction, as shown in FIG. 2. Of course, a distance between the adjacent position limiting blocks 13 of the first position limiting unit 30 may be greater than or equal to a width of the data line 22, so that the data line 22 may be clamped between the position limiting blocks 13 at two sides of the black matrix 11 in the extending direction. Similarly, a distance between the adjacent position limiting blocks 13 of the second position limiting unit 40 may be greater than or equal to the width of the gate line 21, so that the gate line 21 may be clamped between the position limiting blocks 13 at two sides of the black matrix 11 in the extending direction. Alternatively, the position limiting blocks 13 may also be asymmetrically arranged at two sides of the black matrix 11 in the extending direction. The positions and distribution of the position limiting blocks 13 are not particularly defined herein.

Optionally, there may be two position limiting blocks 13 arranged at two sides of the black matrix 11 in the extending direction, respectively, and extending toward an edge of the black matrix 11 in the extending direction, i.e., the position limiting blocks 13 each have a length identical to a length of the black matrix 11, so that the position limiting blocks 13 and the black matrix 11 may form a groove as a whole. When the color filter substrate 10 and the array substrate 20 are arranged opposite to each other to form a cell, the data line 22 may be clamped within a groove 130 formed by the position limiting blocks 13 of the first position limiting unit 30 and the black matrix 11, and the gate line 21 may be clamped within the groove 130 formed by the position limiting blocks 13 of the second position limiting unit 40 and the black matrix 11. Also, the position limiting blocks 13 of the first position limiting unit 30 or the second stooping unit 40 may not have a length identical to a length of the black matrix 11, as long as the position limiting blocks 13 are arranged at two sides of the black matrix 11, respectively, and may be used to clamp the data line 22 or the gate line 21 so as to accurately align the data line 22 or gate line 21 when the color filter substrate 10 and the array substrate 20 are arranged opposite to each other to form a cell.

FIG. 4 is a schematic view showing relationship between the black matrix 11 as well as the position limiting units 30, 40 on the color filter substrate 10 and the gate lines 21 as well as the data lines 22 on the array substrate 20 according to one embodiment of the present disclosure. As shown in FIG. 4, the black matrix 11 may be divided into a plurality of first extension portions 112 and a plurality of second extension portions 114. The first extension portions 112 extend in a first direction D1 and correspond to the data lines 22 in a one-to-one manner. In other words, the first direction D1 may be the lengthwise direction of the data line 22. The second extension portions 114 extend in a second direction D2 substantially perpendicular to the first direction D1, and correspond to the gate lines 21 in a one-to-one. In other words, the second direction D2 may be the lengthwise direction of the gate line 21. The first position limiting unit 30 may include a pair of position limiting blocks 13 projecting from two sides of at least one of the first extension portions 112, respectively. The position limiting blocks 13 each may have a length in the first direction D1 identical to or different from a length of the data line 22 corresponding to at least one of the first extension portions 112 in the first direction D1. In addition, the two position limiting blocks 13 in each pair may be arranged symmetrically, or asymmetrically, as long as they may clamp the corresponding data line 22.

Similarly, the second position limiting unit 40 may also include a pair of position limiting blocks 13 projecting from two sides of at least one of the second extension portions 114, respectively. The position limiting blocks 13 each may have a length in the second direction D2 identical to or different from a length of the gate line 21 corresponding to at least one of the second extension portions 114 in the second direction D2. In addition, the position limiting blocks 13 in each pair of the second position limiting unit 40 may be arranged symmetrically, or asymmetrically, as long as they can clamp the corresponding gate line 21.

In order to reduce the process steps so as to improve the operating efficiency, the first position limiting unit 30 and the black matrix 11 may be formed integrally, i.e., they are made of an identical material and formed simultaneously on the base substrate 14 of the color filter substrate 10. It should be appreciated that, the first position limiting unit 30 may be formed separately and then mounted onto the black matrix 11; at this time, the first position limiting unit 30 may be made of a material different from that of the black matrix 11. Of course, the second position limiting unit 40 and the black matrix 11 may also be formed integrally, or the first position limiting unit 30, the second position limiting unit 40 and the black matrix 11 may be formed integrally.

One embodiment of the present disclosure further provides a method for manufacturing the color filter substrate 10, which is arranged opposite to the array substrate 20 to form a cell and thereby form the display panel. The method includes: forming a color filter layer including the black matrix 11 and the color filters 12 on the base substrate 14 of the color filter substrate 10, and forming on the black matrix 11 the first position limiting unit 30 for clamping the data line 22 on the array substrate 20. The first position limiting unit 30 includes a plurality of position limiting blocks 13 arranged at two sides of the black matrix 11 in the extending direction, respectively.

Optionally, the black matrix 11 and the first position limiting unit 30 may be formed integrally.

Specifically, a black matrix coating is first formed on the base substrate 14 of the color filter substrate 10 by sputtering, coating or evaporating, and the groove 130 corresponding to the data line 22 on the array substrate 20 is formed on the black matrix coating by a first patterning process, such as exposing, developing and etching. Specifically, the black matrix coating is exposed and developed with a mask plate having a particular pattern, and then a photoresist at a groove region is etched off so as to form the groove 130 which may be used for clamping the data line 22 on the array substrate 20.

Next, a pixel open region is formed on the black matrix coating with the groove 130 by a second patterning process such as exposing, developing and etching, and the black matrix 11 including the first position limiting unit 30 is formed at the region other than the pixel open region. Specifically, the black matrix coating with the groove 130 is exposed and developed with another mask plate having a particular pattern, the photoresist at a pixel region is etched off to form the pixel open region, and then the black matrix 11 including the first position limiting unit 30 is formed at the remaining region. The two sides of the groove 130 on the black matrix 11 are just the first position limiting unit 30, and the pixel open region is used to form the color filter 12.

After the black matrix 11 including the first position limiting unit 30 is formed, the color filter 12 of the color filter layer is formed at the pixel open region.

Correspondingly, in order to improve the alignment accuracy of the gate line 21 on the array substrate 20, when the first position limiting unit 30 is formed on the black matrix 11 corresponding to the data line 22 on the array substrate 20, the second position limiting unit 40 for clamping the gate line 21 on the array substrate 20 is also formed on the black matrix 11 opposite to the gate line 21 on the array substrate 20. Optionally, the second position limiting unit 40 and the black matrix 11 may be formed integrally.

Optionally, the first position limiting unit 30, the second position limiting unit 40 and the black matrix 11 may be formed integrally.

A black matrix coating is first formed on the base substrate 14 of the color filter substrate 10 by sputtering, coating or evaporating, and a plurality of grooves 130 corresponding to the data lines 22 and the gate lines 21 on the array substrate 20 is formed on the black matrix coating by a first patterning process such as exposing, developing and etching. Specifically, the black matrix coating is exposed and developed with a mask plate having a particular pattern, and then a photoresist at a groove region is etched off so as to form the grooves 130 which may be used for clamping the data lines 22 and the gate lines 21 on the array substrate 20.

Next, a pixel open region is formed on the black matrix coating with the grooves 130 by a second patterning process such as exposing, developing and etching, and the black matrix 11 including the first position limiting unit 30 and the second position limiting unit 40 is formed at the region other than the pixel open region. Specifically, the black matrix coating with the grooves 130 is exposed and developed with another mask plate having a particular pattern, the photoresist at a pixel region is etched off to form the pixel open region, and the black matrix 11 including the first position limiting unit 30 and the second position limiting unit 40 is formed at the remaining region. The two sides of the groove 130 on the black matrix 11 are just the first position limiting unit 30 or the second position limiting unit 40, and the pixel open region is used to form the color filter 12.

One embodiment of the present disclosure further provides a display device including the above-mentioned display panel.

According to the color filter substrate, the method for manufacturing the same, the display panel and the display device of the present disclosure, the first position limiting unit configured to clamp the data line is arranged on the black matrix arranged opposite to the data line, so as to ensure accurate alignment of the data line on the array substrate with the black matrix on the color filter substrate, thereby preventing alignment offset for the LCD, reducing the occurrence of such defects as cross color and light leakage, and improving the yield of the product. Further, the second position limiting unit configured to clamp the gate lines is arranged on the black matrix arranged opposite to the gate line, so as to ensure accurate alignment of the gate line on the array substrate with the black matrix on the color filter substrate. In addition, the black matrix and the first, second position limiting units may be formed integrally, and as a result, the process steps and the process complexity may be reduced, thereby improving the production efficiency and saving materials.

The foregoings are merely exemplary embodiments of the present disclosure. It should be appreciated that, a person skilled in the art may make further improvements and substitutions without departing from the principle of the present disclosure, and these improvements and substitutions shall also fall within the scope of the present disclosure.

What is claimed is:

1. A color filter substrate arranged opposite to an array substrate to form a cell and thereby form a display panel, the color filter substrate comprising a plurality of color filters and a black matrix arranged between adjacent color filters; wherein the color filter substrate further comprises a position limiting unit arranged on the black matrix and configured to clamp at least one of data lines and gate lines on the array substrate;

wherein the position limiting unit comprises at least one first position limiting unit configured to clamp at least one of the data lines on the array substrate;

wherein the black matrix comprises a plurality of first extension portions and a plurality of second extension portions; the plurality of first extension portions extend in a first direction and correspond to the data lines in a one-to-one manner; the plurality of second extension portions extend in a second direction perpendicular to the first direction and correspond to the gate lines in a one-to-one manner; wherein the first position limiting unit comprises at least one pair of position limiting blocks protecting from two sides in the second direction of at least one of the first extension portions, respectively;

wherein the position limiting blocks in each pair are arranged symmetrically; and wherein the at least one of the data lines is between the position limiting blocks in each pair, and two opposite sides of the at least one of the data lines are in direct contact with the position limiting blocks in each pair, respectively.

2. The color filter substrate according to claim 1, wherein the position limiting block in each pair has a length in the first direction identical to a length of the at least one of the first extension portions in the first direction.

3. The color filter substrate according to claim 1, wherein the position limiting unit further comprises at least one second position limiting unit configured to clamp at least one of the gate lines on the array substrate.

4. The color filter substrate according to claim 3, wherein the second position limiting unit comprises at least one pair of position limiting blocks projecting from two sides in the first direction of at least one of the second extension portions, respectively.

5. The color filter substrate according to claim 4, wherein the position limiting blocks of the second position limiting unit in each pair are arranged symmetrically;

wherein the at least one of the gate lines is between the position limiting blocks of the second position limiting unit in each pair, and two opposite sides of the at least one of the gate lines are in direct contact with the position limiting blocks of the second position limiting unit in each pair, respectively.

6. The color filter substrate according to claim 4, wherein the position limiting block of the second position limiting unit in each pair has a length in the second direction identical to a length of the at least one of the second extension portions in the second direction.

7. The color filter substrate according to claim 1, wherein the position limiting unit and the black matrix are formed integrally;

wherein the color filter substrate further comprises a base substrate; the plurality of color filters are in direct contact with the base substrate; the black matrix is in direct contact with the base substrate.

8. A display panel comprising an array substrate and a color filter substrate arranged opposite to each other;

wherein the color filter substrate comprises a plurality of color filters and a black matrix arranged between adjacent color filters;

the array substrate comprises a plurality of gate lines, a plurality of data lines, and a plurality of pixel units defined by the gate lines and the data lines; and the color filter substrate further comprises a position limiting unit arranged on the black matrix and configured to clamp at least one of the data lines and the gate lines on the array substrate;

wherein the position limiting unit comprises at least one second position limiting unit configured to clamp at least one of the gate lines on the array substrate;

wherein the black matrix comprises a plurality of first extension portions and a plurality of second extension portions; the plurality of first extension portions extend in a first direction and correspond to the data lines in a one-to-one manner; the plurality of second extension portions extend in a second direction perpendicular to the first direction and correspond to the gate lines in a one-to-one manner; wherein the second position limiting unit comprises at least one pair of position limiting blocks protecting from two sides in the first direction of at least one of the second extension portions, respectively;

wherein the at least one of the gate lines is between the position limiting blocks in each pair, and two opposite sides of the at least one of the gate lines are in direct contact with the position limiting blocks in each pair, respectively.

9. The display panel according to claim 8, wherein the position limiting unit comprises at least one first position limiting unit configured to clamp at least one of the data lines on the array substrate.

10. The display panel according to claim 9, wherein the first position limiting unit comprises at least one pair of position limiting blocks projecting from two sides in the second direction of at least one of the first extension portions, respectively.

* * * * *